US006668244B1

(12) United States Patent
Rourke et al.

(10) Patent No.: US 6,668,244 B1
(45) Date of Patent: Dec. 23, 2003

(54) METHOD AND MEANS OF VOICE CONTROL OF A COMPUTER, INCLUDING ITS MOUSE AND KEYBOARD

(75) Inventors: Michael Rourke, Tyngsboro, MA (US); Robert Clough, Chelmsford, MA (US); Peter Brackett, Tyngsboro, MA (US)

(73) Assignee: Quartet Technology, Inc., Tyngsboro, MA (US)

( * ) Notice: Subject to any disclaimer, the term of this patent is extended or adjusted under 35 U.S.C. 154(b) by 0 days.

(21) Appl. No.: 08/683,824

(22) Filed: Jul. 18, 1996

Related U.S. Application Data

(60) Provisional application No. 60/001,383, filed on Jul. 21, 1995.

(51) Int. Cl.[7] .................................................. G10L 21/00
(52) U.S. Cl. ........................ 704/275; 704/270; 704/235; 709/328; 709/238; 709/320; 709/318; 700/83; 707/104.1; 707/17; 703/13; 712/35
(58) Field of Search ................. 395/2.84, 500; 704/270, 275, 235; 364/188, 146, 708, 900; 700/83; 707/104, 1, 17; 709/100, 107, 318, 328, 238, 320; 703/13; 712/35

(56) References Cited

U.S. PATENT DOCUMENTS

| | | | | |
|---|---|---|---|---|
| 4,689,761 A | * | 8/1987 | Yurchenco | 364/708 |
| 4,776,016 A | * | 10/1988 | Hansen | 381/42 |
| 4,964,075 A | * | 10/1990 | Shaver et al. | 364/900 |
| 5,062,070 A | * | 10/1991 | Lapeyre | 200/50.1 |
| 5,086,385 A | * | 2/1992 | Launey et al. | 364/188 |
| 5,157,384 A | * | 10/1992 | Greanias et al. | 340/706 |
| 5,245,558 A | * | 9/1993 | Hachey | 364/708.1 |
| 5,261,079 A | * | 11/1993 | Celi, Jr. | 395/500 |
| 5,335,313 A | * | 8/1994 | Douglas | 395/2.84 |
| 5,386,494 A | * | 1/1995 | White | 395/2.84 |
| 5,400,246 A | * | 3/1995 | Wilson et al. | 364/146 |
| 5,406,261 A | * | 4/1995 | Glenn | 340/571 |
| 5,519,809 A | * | 5/1996 | Husseiny et al. | 395/2.84 |
| 5,577,186 A | * | 11/1996 | Mann, II et al. | 395/806 |
| 5,604,771 A | * | 2/1997 | Quiros | 375/326 |
| 5,657,425 A | * | 8/1997 | Johnson | 395/2.84 |
| 5,659,665 A | * | 8/1997 | Whelpley, Jr. | 704/275 |
| 5,745,875 A | * | 4/1998 | Jackson et al. | 704/235 |
| 5,974,384 A | * | 10/1999 | Yasuda | 704/275 |

FOREIGN PATENT DOCUMENTS

| WO | WO 94/20899 | * | 9/1994 | G10L/21/00 |
|---|---|---|---|---|

OTHER PUBLICATIONS

Stifelman ("Voice Input", Voicenotes: AN Application for a Voice–Controlled Hand–Held Computer, Chapter 5, Massachusetts Institute of Technology, pp. 57–70).*

* cited by examiner

*Primary Examiner*—Vijay Chawan
(74) *Attorney, Agent, or Firm*—Steubing McGuinness & Manaras LLP

(57) ABSTRACT

New method and means for controlling the environment of disabled individuals through their voice, which includes the operation of lights or any number of appliances and a personal computer wherein the keyboard and the mouse are separately controlled by voice commands, without interference with normal application, (including dictation programs), operating within the computer. Effectively the voice control provides parallel mouse and keyboard commands with normal mouse and keyboard commands.

1 Claim, 4 Drawing Sheets

METHOD AND MEANS OF VOICE CONTROL OF A COMPUTER, INCLUDING ITS MOUSE AND KEYBOARD

PROVISIONAL APPLICATION

This application is based on a Provisional Application entitled "Voice Mouse and Keyboard Controller for Computers" filed Jul. 21, 1995, Serial No. 60/001,383, with the same owners and inventors.

DISCLOSURE

1. Background of the Invention

The field of this invention is the control of one's environment by a disabled individual, commonly a quadriplegic or others with similar handicaps.

2. Background

There are many devices that have been proposed and actually utilized by quadriplegics and other disabled individuals that permit them to control their immediate environment. They are able with verbal command to turn on a television set, reduce its volume or change its station. There are many other devices that they can control such as lights, radio and even the telephone. A disabled individual has had access to such devices for many years and has been able to control his environment to a great extent and enjoy a measure of independence.

There are unfortunately thousands of quadriplegics and others similarly disabled and there are hundreds more being added every day. Consequently there are a significant number of people who are talented, well educated and well trained in diverse areas—in science, law, engineering and literature who could benefit from access to a computer. These individuals are a great resource for the nation and if their abilities could be utilized, this resource could produce enormous benefits for the individuals themselves, their families and, of course, the nation and world at large. Disabled people concentrate on their work more than people who are not disabled because they have such a strong desire to be productive.

The present inventors have designed devices and products which have enabled disabled individuals to control their environment in many ways. They have now discovered a method and means to enable those disabled individuals to control their environment even more by utilizing a computer.

Computers today, specifically the Macintosh and the Windows applications for IBM, are controlled not only by a keyboard but by a mouse. The mouse is a device which takes physical movement, usually on a flat surface, and converts it into commands which control an arrow or a similar cursor on a screen which permits an operator to select specific items on pulldown menus or on menus or dialog boxes that are presented on the screen. When it is clicked by means of a button on the mouse that item in the menu or dialog box is selected and the individual can then have available to him whatever he selected on the menu. Control, therefore, of the computer is by way of the mouse. There are other commands that are picked out on the keyboard by some pre-programmed keys that set in motion several steps, sometimes referred to as macros. In any event, all of these or a combination of these signals can be accomplished by the present invention in such a manner that the quadriplegic can at the beginning of a day turn on the lights in his or her room, open the windows and also turn on his or her computer. Without assistance, he or she can even turn on the modem. Once the modem is on, he or she is in contact with the world. When they finish their work, they can transfer it by means of the modem to an employer or individual located anywhere in the world. They can now truly be part of the work force again.

Such a procedure will enable quadriplegics to edit technical material or literature, write newsletters, even books, and also share their input. They can also, through computer aided drafting devices, design products, bridges and whatever else that is needed. The possibilities are endless. The only stumbling block preventing this is a product that is reliable, easily used and permits the individual to control his or her environment, including the personal computer, as readily as his non-disabled colleagues.

One of the great difficulties presented which has frustrated the accomplishment of these goals has been applications that are normally running in the computer that interfere with one another, especially applications for the disabled if they are internal to the personal computer. The accomplishment of the present invention is in the exclusive use of verbal commands external to the personal computer such that any application currently available to a personal computer owner is also available and useable by the disabled. The present invention does not interfere with or even couple directly to the applications running within the personal computer. The present invention is entirely external to, yet controls entirely, a personal computer.

The present invention provides parallel voice input and control of a keyboard and mouse that is and can continue to be used normally by any non-disabled individual simultaneously with a disabled person.

A significant benefit has been discovered. A quadriplegic can have an ongoing relationship with a non-disabled individual; that is, they can actually play cards and other games on the computer together. More importantly, a person familiar with an application can train a quadriplegic in its use by working with him or her simultaneously. This alone is an enormous advantage. Just about anyone who can operate a mouse and keyboard can train, work with and have fun with a disabled person.

In fact, the process could be reversed as a general training tool. The instructor can control the computer verbally or with a second keyboard and mouse while the regular keyboard and mouse are controlled by an individual trainee. In that case it could be an individual who is not disabled.

Our present concern is with the training of a disabled individual in the control of a personal computer, mouse and keyboard in parallel with a normal keyboard and mouse.

The present invention was developed in such a way that the input to the computer processing unit from the keyboard and mouse is intercepted and combined with verbal commands from the quadriplegic individual to control the personal computer and especially the cursor on the screen which is positioned by the mouse before a selection is made.

Some disabled people are unable to speak. They have been able to trip a switch or even a dual switch. Even with such limited physical abilities, a disabled person can be trained to control a keyboard and mouse by means of Morse code. They, of course, cannot take advantage of the voice applications on a personal computer, but they certainly can turn it off or on and type a message and operate a modem.

Therefore, an object of the present invention is to provide a voice controlled computer mechanism for quadriplegics.

Another object of the present invention is to provide means for controlling a keyboard and mouse by verbal commands.

Another object of the present invention is to provide parallel inputs with verbal commands with those of normal input commands from a keyboard and mouse at the same time.

Another object of the present invention is to monitor all voice commands before applying them to a personal computer.

Another object of the present invention is to retain certain keyboard commands to provide multiple keystroke commands where required.

Another object of the present invention is to lock selected keyboard commands for later release by other keyboard commands.

Another object of the present invention is to provide Morse code in place of voice by means of dual switches for disabled individuals who cannot speak.

Another object of the present invention is to enable a disabled person to run a personal computer without any assistance from anyone.

Another object of the present invention is to enable a disabled person to operate a computer without any appliances or special devices attached to it.

Another object of the present invention is to enable a disabled person to operate a computer through a single microphone.

Another object of the present invention is to permit dynamic control of a mouse such that it can be speeded up or slowed down or even the direction changed while in motion.

Another object of the present invention is to provide a mouse that can be controlled one pixel at a time to achieve an accuracy unachievable in a physical mouse.

Another object of the present invention is to provide means for operating a computer that is completely independent of applications or programs running in a personal computer.

Another object of the present invention is to provide a device that can replace a keyboard and mouse completely on a personal computer.

DESCRIPTION OF THE DRAWINGS

Our invention will be better understood with reference to the attached drawings of which:

BRIEF DESCRIPTION OF THE DRAWINGS

Figure 1:
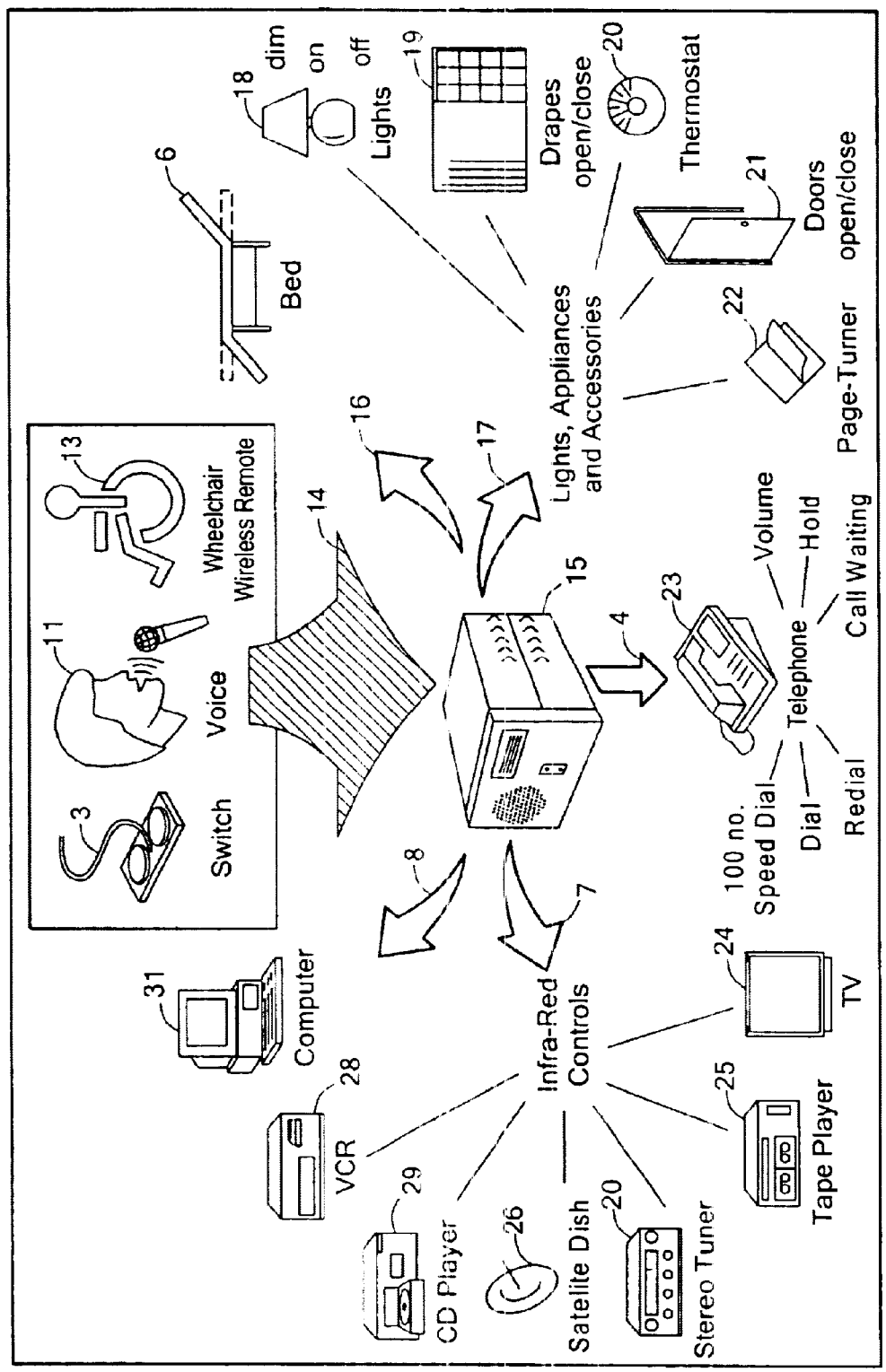

FIG. 1 is a schematic diagram showing the disabled individual controlling all of the devices and equipment in his environment through the voice computer.

Figure 2:
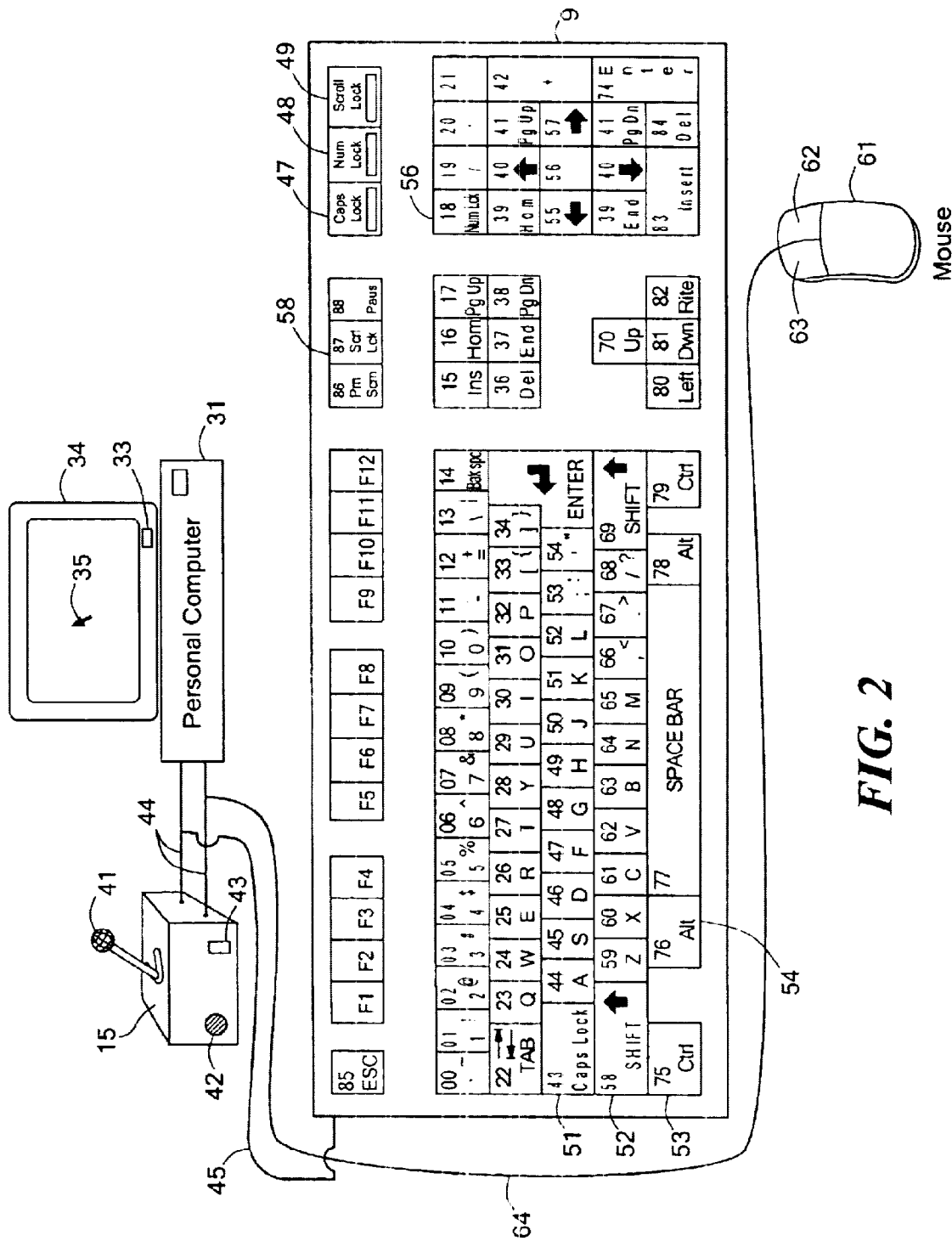

FIG. 2 is a schematic diagram showing the voice computer controlling the input from the keyboard and mouse to a personal computer through voice control.

Figure 3:
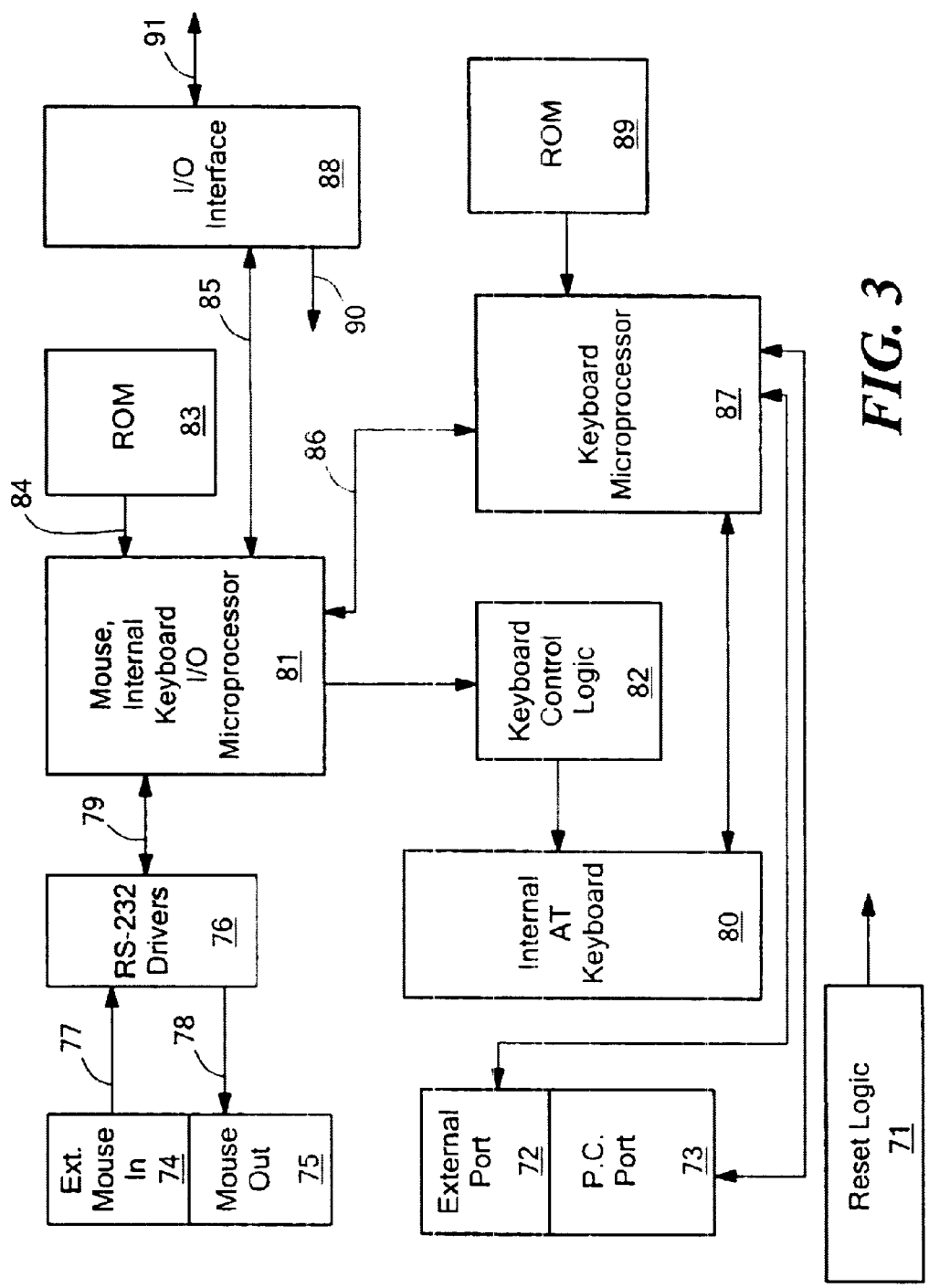

FIG. 3 is a schematic block diagram showing the functional relationship of the voice controlled mouse and keyboard integrated with a physical mouse and keyboard.

Figure 4:
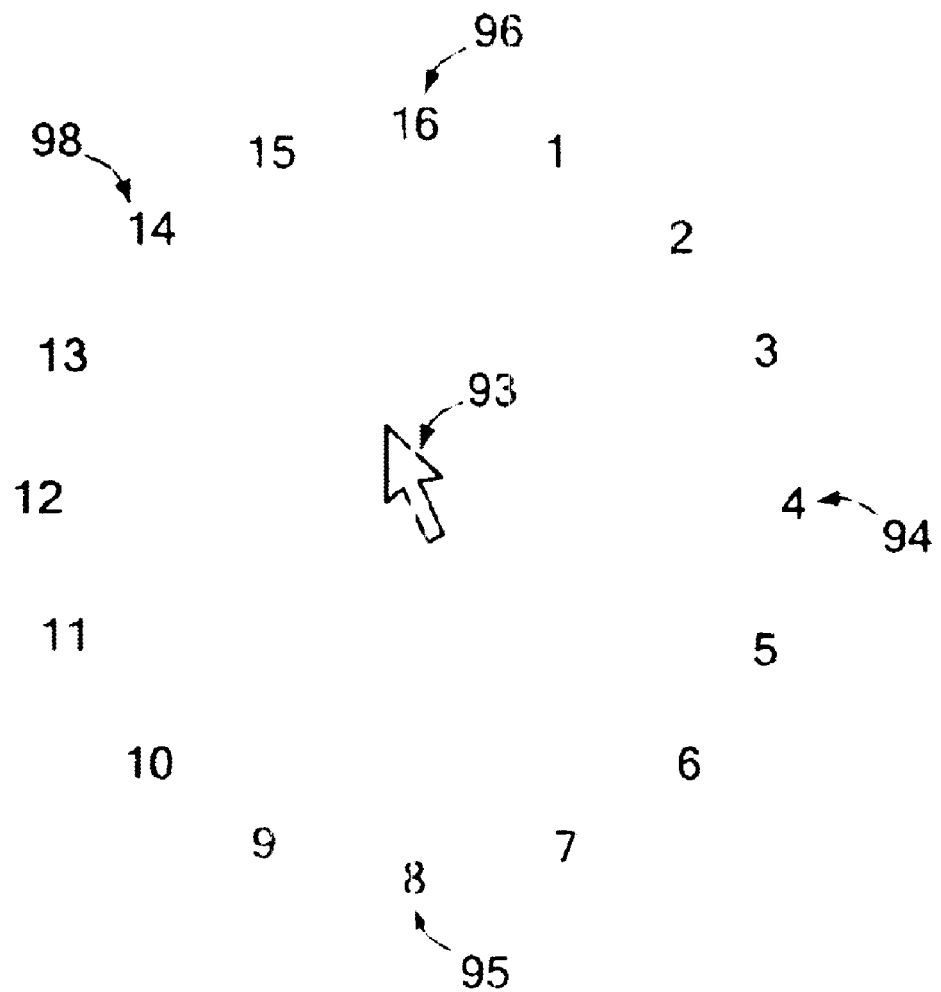

FIG. 4 is a diagram showing the direction the voice provides to the mouse in order to get it to move in a desired direction on the monitor.

Referring to FIG. 1, we see a speaker 11, through a microphone attached to his or her bed or wheelchair with a wireless remote microphone, communicate with the voice computer of the present invention. The voice computer 15 has built within it a voice recognition program. This program is the type that requires training. The reason for the training is that the computer and the individual are required to work together and the computer only responds effectively to its master's voice and not from extraneous sound or voices by other people in his or her room or nearby or from any background noise. As will be noted later, the voice can also be passed through to a personal computer to control certain voice applications such as Kurzweil Voice for Windows running on a personal computer. The voice commands that pass through are untrained, but those for the voice computer are trained. The Kurzweil program is easily corrected and designed for ease of change. The portion of voice commands for the voice computer are more rigidly controlled. The reason for this need is obvious—extraneous commands could cause doors to open or windows to close and cause injury and other problems or turn the lights off at very inconvenient moments. Errors with this system have been virtually reduced to zero. None of the appliances or devices are interfered with through extraneous conversations.

The voice computer can turn on or off all appliances. It can answer a telephone. It can control everything in the room or immediate environment of a disabled person with no difficulty whatsoever. In order for a disabled individual to be gainfully employed however, he or she must now turn to a personal computer. Once an individual can turn on a personal computer, many of the applications that will appear are voice controlled. There are many products available for use on personal computers such as Kurzweil and Dragon, along with others. Kurzweil is a program that has been used effectively with this invention. The Kurzweil program permits the operator with voice commands to navigate through many applications as well as dictate. It accepts dictation from any individual after opening a word processing program, such as WordPerfect or Word and many others. They can dictate whatever they choose to write and can edit their own work. They can also access other programs by means of a voice navigation system that is provided for by the Kurzweil program. However, that application, as well as others, has limitations for it does not permit the control of the mouse cursor and the keyboard independently and they are not complete enough for disabled individuals.

In the present invention the microphone that controls the voice mouse keyboard permits the voice also to control personal computer application programs such as Kurzweil directly but under the strict control of the voice mouse computer.

Referring now to FIG. 2, we see a keyboard and a mouse 61 which is wired to the keyboard 9 by cable 64 and the keyboard is wired to the voice computer 15. The keyboard has a complete array of keys, numbers and access to macros which are usually assigned by the application. The voice computer has a microphone 41 and a speaker 42. Indicator 43 shows when it is on. It is to be noted that the voice computer must be on first; it is usually on all the time such that the operator has control of everything in his or her environment, as well as the computer. Through various commands the computer through its cable 41 is turned on with its monitor 34. The indicator lights 32 and 33 are also on. On the keyboard the various locks 47, 48 and 49—the number lock, capital lock and the scroll lock, are also shown. This indicates what's happening in the computer such that the individual can glance at it and correct it. There is usually no need to have, on the voice computer, any visual signals. The voice computer tells (through a voice statement from the voice computer's own speaker) the operator what is happening and what he or she must do next in order to control the computer. It is also obvious that the computer will on its screen provide the cues that are needed to operate the application that is currently being worked on. The voice control applications permit the individual to control tables of data, as well as dictation and computation. However, in order to do anything with graphics, the mouse cursor is necessary and the voice mouse computer provides signals that cause the cursor 35 to move about on the monitor 34. The mouse then commands the computer to execute whatever is necessary. Commands such as click and drag in order to move various screens about and various objects on the screen for graphic presentation and in other programs to erase or color physically the various graphic images that are presented. Moreover, dialog boxes can be answered and filled in very efficiently with the keyboard and mouse coordinated together through the voice computer. While the voice computer is active and the operator is controlling the computer and the cursor, a companion can also simultaneously operate the keyboard and mouse such that they can work together. The mouse and keyboard are controlled but they are not disabled from the computer at any time. Signals from the voice mouse and keyboard are coordinated with the physical keyboard and mouse.

Referring now to FIG. 3, we see the external mouse input 74 as it feeds into RS-232 drivers and we also see a mouse output 75 with its input/output 78 to the RS-232 drivers. The disabled person follows the cursor on the screen and changes his commands as needed. When you click the mouse, it generates a signal for the computer to take the desired action at the point shown on the monitor. The mouse output is applied directly to the personal computer. The mouse driver has an input/output microprocessor 81 which is supplied by a read only memory 83 and of course the microphone input/output interface 88. The input 91 by way of the microphone and the output by way of a speaker to the individual. The output 90 can be applied directly to the computer in place of the microphone that is built in to most computers to operate the applications such as Kurzweil if the voice computer were not involved. The keyboard microprocessor 87 has its own read only memory 89 which provides an array of signals that are necessary for the keyboard. It is to be noted that voice recognition can also be replaced to some extent with a Morse code programmed microprocessor which enables people who are unable to speak to control the keyboard and mouse. In this situation two switches (or even just one if a person is so severely limited) are necessary in order to speed up the operation. If an individual only has the ability to puff air or suck in, he or she too can control this voice computer even though they cannot speak. They can type out messages, fax these messages to an employer or receive faxes and edit materials just as handily as their other disabled colleagues who can speak. Reset logic 71 sets the device such that messages can be properly synchronized to the voice computer and stored. The external keyboard 72 again is an input device that enables the normal keyboard to be integrated with the internal keyboard 80 in such a way that the two are controlled so that only one signal is applied to the internal keyboard output 73 and directly to the personal computer 31.

Referring now to FIG. 4, we see a center 93 which is the locus of the computer cursor with the mouse voice signals 1 through 16 surrounding it. The individual tells the computer cursor to move in the direction of 4 and it does so or in a direction 8 or 14 and so forth and the cursor will go in that direction until it is told to stop. The individual can then control the movement of the cursor in any direction on the screen. It can click to lock onto whatever is on the screen that it is pointing to, move it and then double click to release it. It can also make a selection on a menu, such as a pulldown menu. In some applications it is free to draw lines with the cursor or also paint with the cursor, or even erase. It can do all the necessary things that any person can do physically. Voice activated applications that occasionally require a mouse and keyboard are now complete with the present invention. Certain features of this invention are summarized as follows:

For the Computer Menu:

| Keyboard | Go to keyboard menu, Audio disabled |
| Mouse | Go to mouse menu, Audio disabled |
| Turn-on | Enable Audio and go to Root |
| Shutoff | Disable Audio |

Audio enables the voice spoken into the ECU microphone to be transmitted to the personal computer to run its voice recognition applications for dictation and navigation. It can be used in intercoms and HAM radios as well. For use with devices other than PC's, the Audio should be enabled in this menu which supports interrupting the Audio for the purpose of running other electronic control unit (voice computer) functions and returning to the Audio on the completion of the other function without specifically re-enabling the audio function.

The Keyboard Commands Are:

| Cancel | Cancel |
| Mouse | Go go MOUSE menu |
| (Keyboard | Go to this menu) |
| Enter | Keyboard enter |
| 0–9 | Digit of key number |
| Retry | Repeat, last key '0–16' times |
| Mute | 'Play' then audio enable, 'mute' to re-enter menu |
| No. function: | |
| 1–12 | Keyboard function keys |
| 13 | Hold Shift Key(s) |
| 14 | unconditionally release all keys |
| Play | Play recorded keys |
| Record: | |
| Record | Save and return to keyboard menu |
| 0–9 | Key code entry |
| No | Delete last digit entered |

For Special Keys Such as Shift Keys (Shift, Alt or Ctrl):

1. All Shift Key(s) entered will be held until the first non-shift key entered, then the shift/non-shift key combination is sent.

2. Some applications require a 'shift' key to be held while several non-shift keys are entered. FUNCTION 13/14 were implemented to accommodate this. FUNCTION 13 holds shift key(s) until FUNCTION 14 is entered.

Some applications require just a shift key stroke, without another non-shift key following. FUNCTION 14 accommodates this by unconditionally releasing all keys, including the shift key.

The usual keyboard for an AT computer does not have "F" keys beyond twelve. In the present invention special macros were placed in the program to permit the user to give an "F" 13, 14 or 15 verbal command and attain the special functions enumerated.

For Rapid Entry of Multiple Keystrokes (Record/Play):

Some applications expect multiple keystrokes in rapid succession, or some keystrokes to be issued without an immediate verbal command. RECORD enables buffering of keystrokes (keystrokes will not show on the monitor). PLAY/MUTE will play last recorded sequence of keys. To clear the recorded keys do RECORD, RECORD. This function can store and play up to 16 keystrokes. Use of this function should be tested with target application since there is no mechanism provided to allow for application dependent timing variations.

To Control the Mouse with Verbal Commands you state a number (1–16) which is in the mouse main menu. The mouse cursor will move from center (+) in the approximate direction shown on map in FIG. 4 that corresponds to that number.

Mouse Commands After That Are:

| | |
|---|---|
| Cancel | Cancel |
| Keyboard | Go to keyboard menu |
| (Mouse | Go to this menu) |
| Enter | Resume moving cursor |
| Forward | Move in last direction given |
| Reverse | Move opposite given direction |
| 1–16 | New direction (starts or continues movement) |
| Up/Down | Control speed of mouse |
| Stop | Stop free moving mouse |
| Retry | Repeat last button function |
| Mute | 'retry' then audio enable, 'mute' to re-enter menu |

Function:
1—click left button
2—double click left button
3—click pause left button for (0–16) delay periods
4—hold left button
5—release left button
6—click right button
7—double click right button
8—click pause right button for (0–16) delay periods
9—hold right button
10—release right button Pause—select high/low mouse speed (0–16)

Right/Left Buttons:
  Click—Releases button then issues single click
  Double Click—Releases button then issues double click
  Click Pause—Hold button down for (0–16) delay periods
  Hold—Issues button down in every mouse transmission until release command issued
  Release—releases held button Forward/Reverse:
  Select direction with respect to last direction given. If command issues when the mouse cursor is stopped, then the cursor is moved one increment in the selected direction else the mouse continues at the current rate in the selected direction.

Up/Down:
  Controls the speed of the mouse's movement.

A typical personal computer system (hardware and software or equivalent) for operation of the present invention are:

IBM AT Compatible PC with ISA Bus:
  a. 486 DX 33 Mhz 32 Meg RAM, 210 Meg Hard Drive
  b. Sound Blaster Board
  c. 1.44 Meg 3.5" Floppy Drive
  d. VGA Color
  e. DOS 6.2
  f. Kurzweil, Dragon or IBM voice type speech detection hardware
  g. IBM compatible mouse driver It should be noted that the keyboard 9 in FIG. 2 has numbers on each key. This enables the speech recognition associated with the keyboard to be reduced to ten words, to wit: zero, one, two, three—to nine. A command "one-five" triggers "insert" key #15. A command "three-five" triggers the enter key #35. The speed of operation may suffer, but accuracy is increased tenfold. By breaking up the numbers as we do above, the words needed to be recognized in the system are reduced from eighty-eight to ten.

Although we have described our invention with reference to specific apparatus, we do not wish to be limited thereby. We only wish to be limited by the appended claims of which.

What is claimed is:

1. A method of voice control of a personal computer comprising of the steps of:
  intercepting an output of a keyboard and a mouse of said personal computer before said output enters said personal computer;
  passing said intercepted output of said keyboard and said mouse to said personal computer through a predetermined input to said personal computer;
  receiving, through a microphone, an audio signal including at least one voice mouse command, wherein said voice mouse command includes indication of a movement of a cursor displayed on a monitor of said personal computer, wherein said indication in said voice mouse command of said movement of said cursor is with respect to a locus on said monitor of said personal computer that is a current location of said cursor, wherein said indication in said voice mouse command of said movement of said cursor includes a number, wherein said number is one of a plurality of numbers, each of said plurality of numbers associated with a respective one of a plurality of predetermined positions within a circular map representing positions surrounding said locus on said monitor of said personal computer;
  causing, through said predetermined input to said personal computer, said cursor to move from said locus towards one of said plurality of predetermined positions within said circular map associated with said number in said voice mouse command.

\* \* \* \* \*